Jan. 23, 1940.  W. E. URSCHEL  2,187,957
DICING MACHINE
Filed May 13, 1937  4 Sheets-Sheet 2
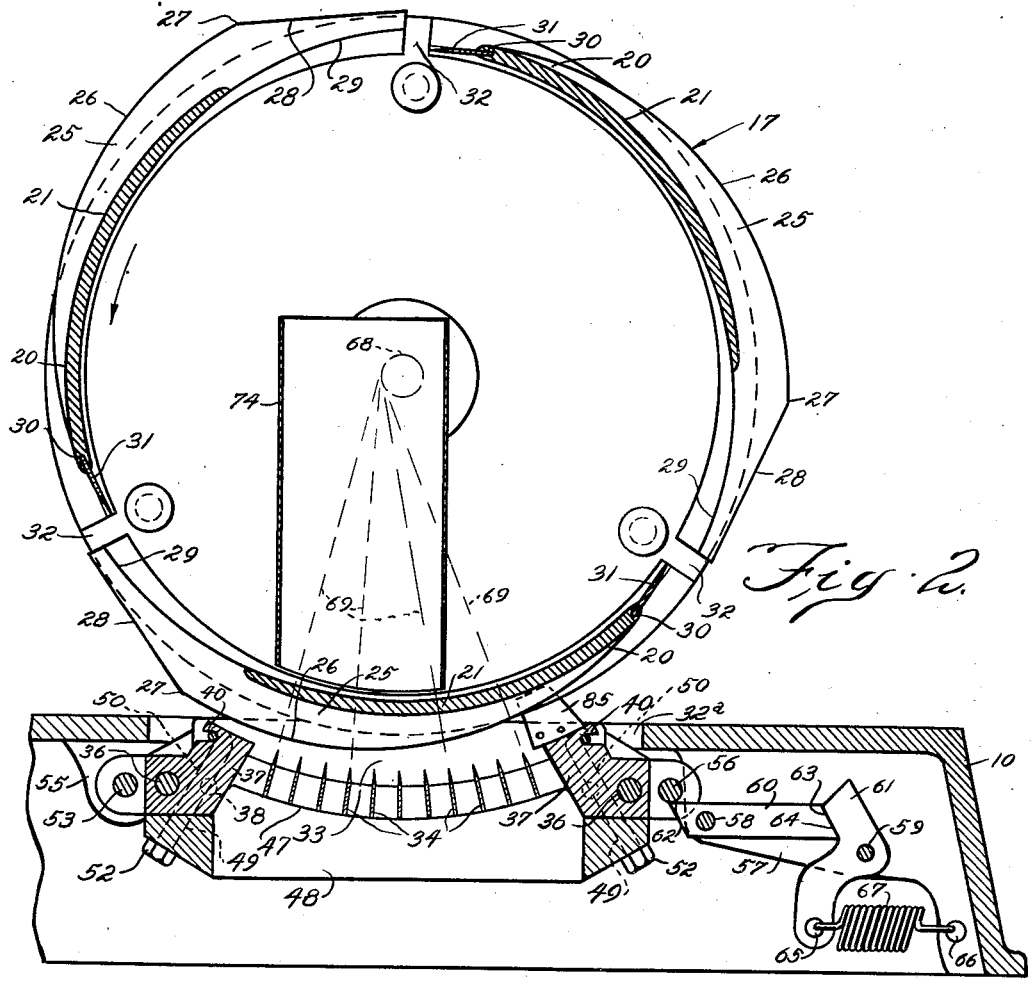
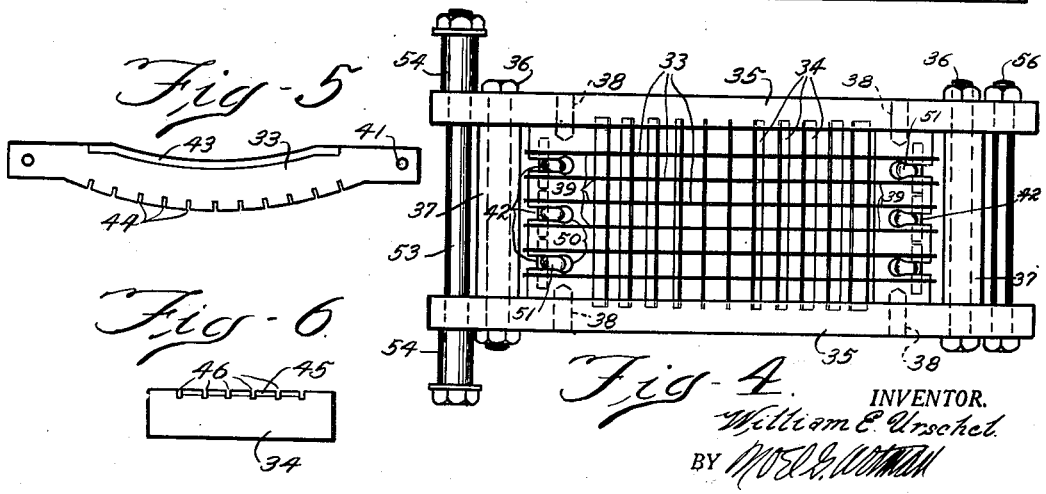
INVENTOR.
William E. Urschel.
BY
ATTORNEY.

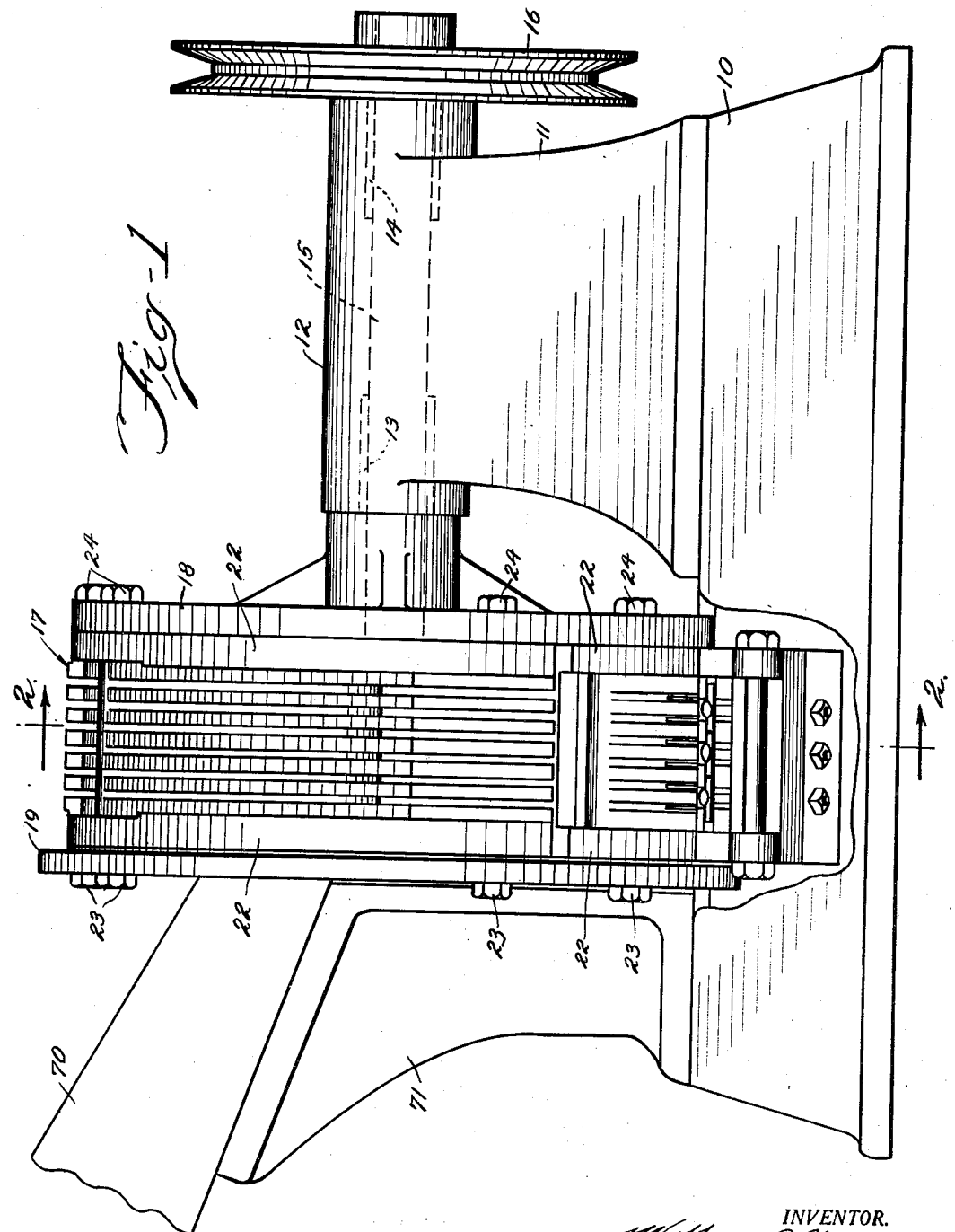

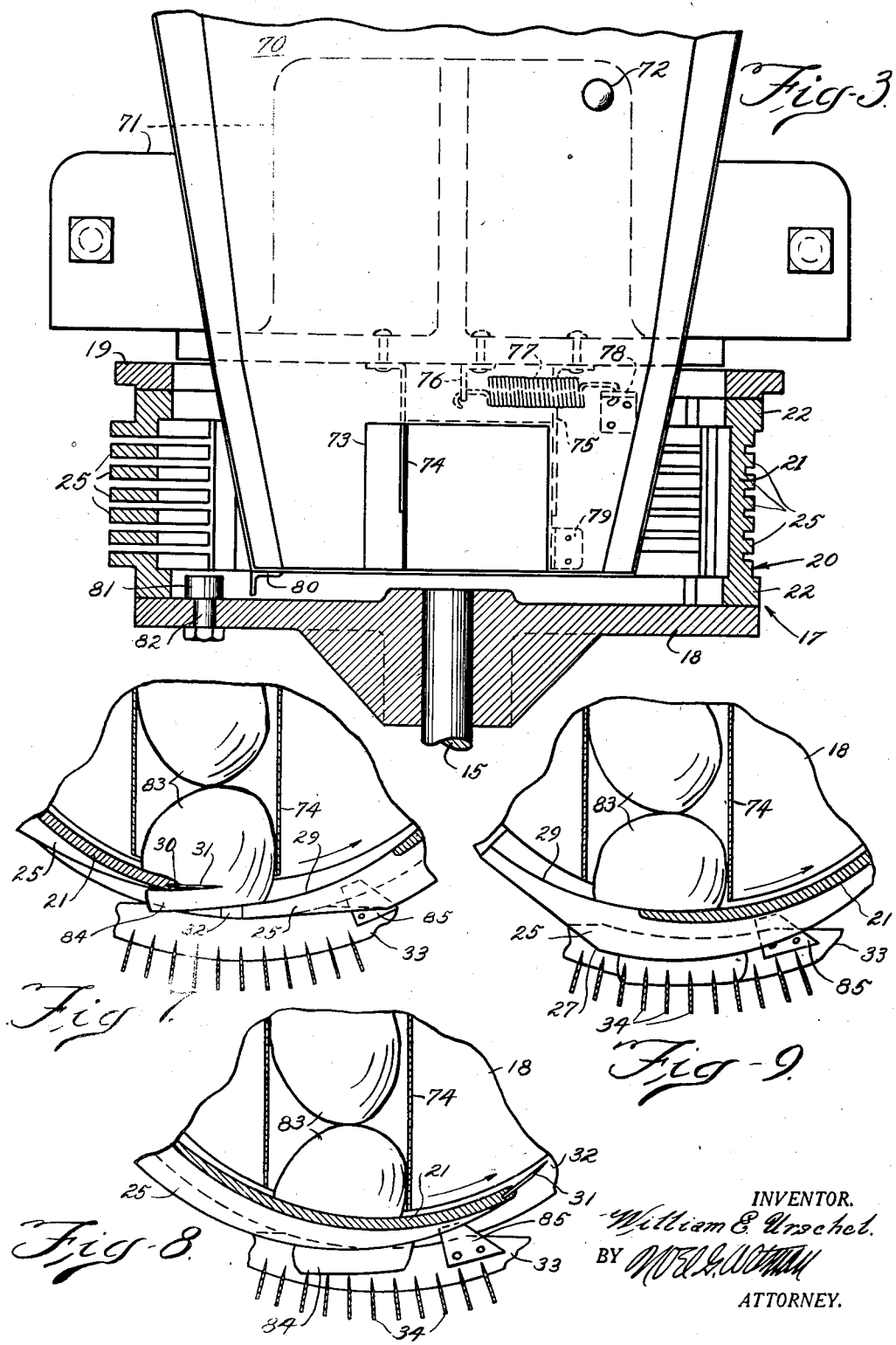

Jan. 23, 1940.   W. E. URSCHEL   2,187,957
DICING MACHINE
Filed May 13, 1937   4 Sheets-Sheet 4
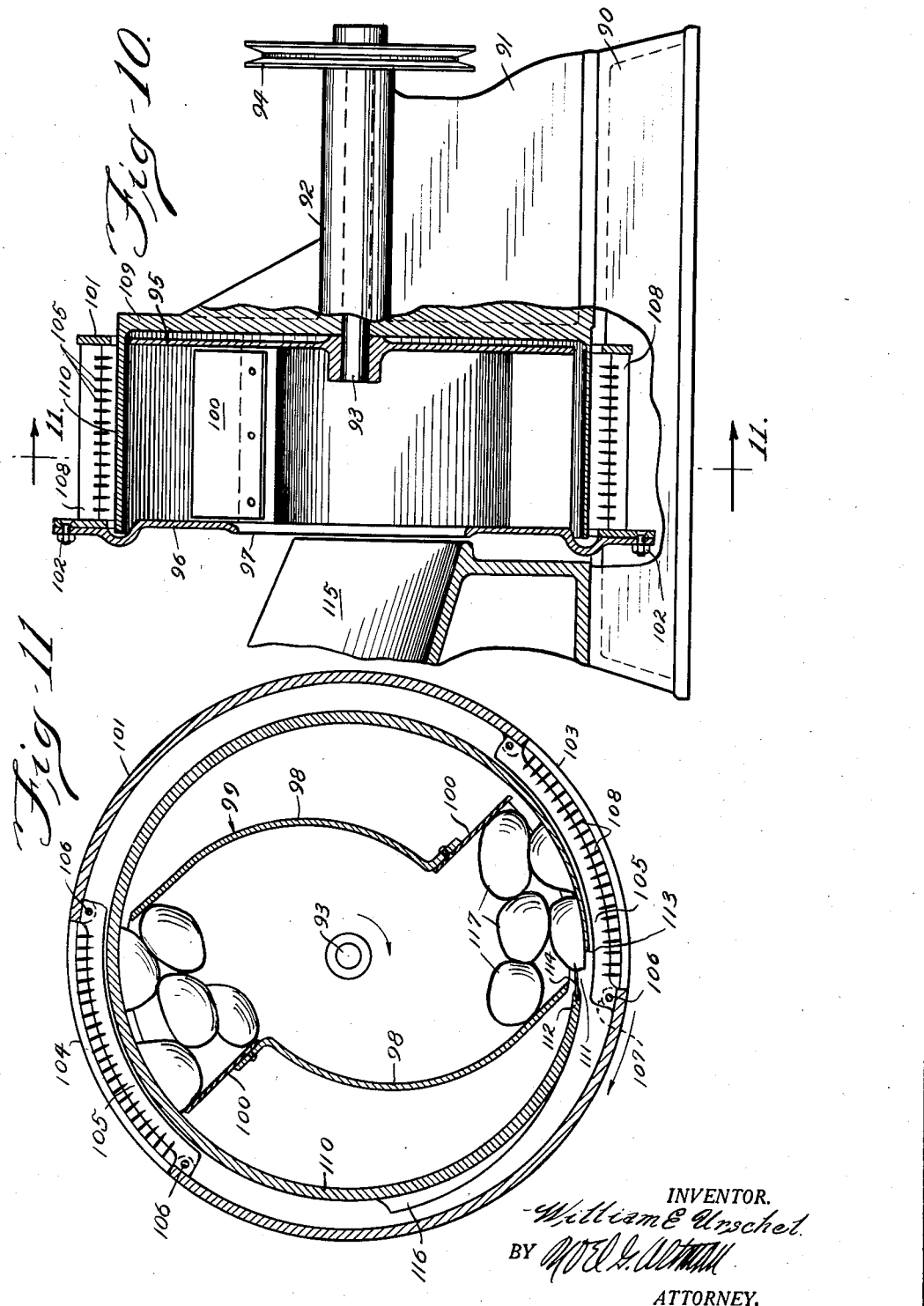
INVENTOR.
William E. Urschel
BY
ATTORNEY.

Patented Jan. 23, 1940

2,187,957

UNITED STATES PATENT OFFICE 2,187,957

DICING MACHINE

William E. Urschel, Valparaiso, Ind.

Application May 13, 1937, Serial No. 142,359

12 Claims. (Cl. 146—78)

This invention relates to fruit or vegetable dicing machines and the like, and has to do more particularly with an improved knife arrangement and knife feeding means therefor.

One of the objects of the present invention is the provision of a new dicing machine capable of operating at high speed while cutting material passed therethrough into small pieces of cubical or other selected configuration, the machine functioning in such a manner as to diminish mashing of the material and to thus conserve its juices.

Another object of the present invention is the provision of a novel dicing machine wherein knife sets are disposed in adjacent planes.

The invention has for another of its objects the provision of a unique set of spaced knives wherein the knife trailing edges are spaced apart at greater distances than the corresponding cutting edges.

Another object of the present invention is the provision of a new combination of knife bank and feeder plate having cam-like ribs adapted to be passed between the knives in such bank.

The above and other desirable objects of the present invention will become apparent upon reading the following description in conjunction with the accompanying four sheets of drawings hereby made a part of this specification, and wherein:

Fig. 1 is a side elevation of a machine embodying the principles of the present invention, a portion of the machine base being cut away for clarity;

Fig. 2 is a transverse sectional view taken on the line 2—2 of Fig. 1;

Fig. 3 is a sectional view taken upon a horizontal plane extending axially through the device as illustrated in Fig. 1;

Fig. 4 is a plan view illustrating in detail the knife sets employed in the machine set out in the figures recited above;

Fig. 5 shows in detail one of the longitudinally extending knives of Fig. 4;

Fig. 6 shows in detail one of the transverse knives shown in Fig. 4;

Figs. 7, 8 and 9 are fragmentary views taken at different stages during the slicing and dicing operation upon a fruit or vegetable within the machine;

Fig. 10 is a sectional view taken upon a vertical plane extending axially through a modified form of machine constructed in accordance with the principles of the present invention; and Fig. 11 is a view taken on the line 11—11 of Fig. 10.

Like parts where shown and designated in several views of the drawings and where referred to hereinafter will be indicated by the same reference character.

The machine is mounted upon a substantially rectangular base 10, Figs. 1 and 2. A standard 11 having a bearing section 12 containing bearing members 13 and 14 rises from the right end of the base 10, Fig. 1. Journalled within the bearing members 13 and 14 is a shaft 15, which carries upon one end a V-grooved driving pulley 16 and upon the opposite end a slicing knife drum structure generally designated 17. The pulley 16 and the drum structure are rotatively fixed to the shaft 15 in any standard manner such as by means of keys (not shown).

The drum structure 17 includes a hubbed end plate 18 and an annular end member 19 which are spaced apart by means of three arcuate side-wall members 20. Each of members 20, Figs. 2 and 3, has a main body section 21 flanked on opposite sides by radially extending flanges 22. Cap screws 23 and 24, for holding the drum structure in assembly, extend respectively through suitable apertures in the annular end member 19 and the end plate 18 into threaded recesses (not shown) in the flanges 22 of the side-wall members 20. In addition to the curved flanges 22 bordering the edges of the main body sections 21, such sections have a plurality of curved ribs 25, which in Fig. 2 will be seen to extend a considerable distance backwardly from the trailing edge of their respective main body sections. The curved outer edges 26 of the ribs 25 will be seen to have a cam-like contour caused by the ribs gradually increasing in radial thickness as they extend from their leading edge to a tip 27. The active part of the cam-like ribs 25, as will become apparent later, is constituted by that portion lying between their leading edge and their tip 27. Between the tip 27 and the trailing edge of the ribs the radial thickness of the ribs may be decreased as shown at 28 in Fig. 2. It will be further noted in Fig. 2 that the inner radial edges 29 upon the trailing sections of the ribs 25 are somewhat cut away or are of increased radius so as to be displaced radially of the drum structure 17 a slightly greater distance than the leading edge of the main body section 21 of the succeeding side-wall member 20. Each main body section 21 is transversely grooved at 30 within its leading edge to receive a knife 31, and because of the radial off-set between such leading edges and the trailing ends of the ribs 25 next preceding them there are effected, between the cutting edges of the knives and such trailing ends of ribs 25, slit-like openings 32 extending axially of the drum structure. The openings 32 permit the discharge from the drum structure of material sliced by the knife blades as will be later fully explained.

Beneath the drum structure 17 is an opening 32a within the top of the base 10. Two sets or banks of knives 33 and 34 are carried upon the under side of the base 10 substantially within the plane of opening 32a as may be seen in Fig. 2. The arrangement of the knives may be best understood by referring concurrently to Figs. 2 and 4 where the bank of longitudinal knives 33 will be seen to be above the bank of transverse knives 34. Knives 33 and 34 are respectively shown in detail in Figs. 5 and 6.

A frame for inter-fabrication of the knives comprises two longitudinal side pieces 35 held together by means of bolts 36 and knifeholder or spacer blocks 37 upon such bolts. Said blocks 37 extend toward one another as may readily be seen in Fig. 2 where they are shown in cross-section. Pivotal movement of the blocks 37 about their respective bolts 36 may be precluded by means of pins 38 anchored in the side pieces 35 and projecting into suitable recesses within the blocks 37 eccentrically of the axes of the bolts 36 extending therethrough. The blocks 37 contain in their upper faces narrow grooves 39 for receiving the ends of the longitudinal knife blades 33. In Fig. 2 the blocks 37 disclose therein undercut grooves 40 which register with apertures 41 in the ends of the longitudinal blades or knives 33. Short pins 42 may be placed within the undercut sections 40 and inserted into the apertures 41 as a means of holding the knives 33 in assembly with the frame structure. At this time it may be well to note that the cutting edge 43 of the knives 33 is arcuate as is plainly illustrated in Fig. 5. Also in Fig. 5 it will be observed that the lower edge of the knives 33 is curved and contains a plurality of notches 44.

The transverse knives 34 in the lower knife bank have a cutting edge 45 containing a series of notches 46 which are spaced apart at intervals corresponding to the spacing of the longitudinal knives 33. The transverse knives 34 are supported upon a curved surface 47 of a block 48. Said block 48 is suitably apertured near its ends for receiving bolts 49 which extend upwardly through apertures 50 in the knifeholder blocks 37. The bolts 49 have hooks 51 upon their upper ends, which hooks engage the pins 42 while the lower ends of the bolts are threaded for receiving nuts 52. By tightening the nuts 52 upon the threaded shanks of the bolts 49 the knife supporting block 48 may be drawn into firm assembly with the knife holding frame while the transverse knives 34 are guided into inter-fabricated relation with the longitudinal knives 33; i. e., the notches 46 of the transverse knives are caused to interlock with the notches 44 upon the lower edge of the longitudinal knives.

The left end of the knife supporting frame, Figs. 2 and 4, is pivotally secured to the under side of the base 10 by means of a bolt 53 which extends through the frame members 35. The bolt 53 may have adjacent to each of its ends bearing sleeves 54 which are journalled within apertures (not shown) of ears 55 projecting downwardly from the under side of the base 10.

Extending between the frame members 35 near their right ends is a latch bolt 56 which is adapted to cooperate with a latch mechanism now to be described. The under side of the base 10 will be seen, Fig. 2, to have a web-like boss 57 in which are anchored pivot pins 58 and 59 for levers 60 and 61. A boss (not shown) similar to the boss 57 may be provided in slightly spaced relation therewith for receiving the ends of the pins 58 and 59 that have been projected through levers 60 and 61. Lever 60 is a simple straight member having a point section 62 upon its left end and an angular bearing section 63 upon its opposite end. Lever 61 is in the general form of a bell crank, such lever having a bearing section 64 for cooperating with the bearing section 63 of lever 60. Apertures 65 and 66, respectively in the lower end of lever 61 and in the web-like boss 57, are adapted to receive the hooked ends of a contraction spring 67. The purpose of the latch mechanism just described will be fully explained hereinafter, but during the normal operation of the machine the latch pin 56 will be held upwardly by the latch mechanism as illustrated in Fig. 2. The curvature of the block surface section 47 for supporting the transverse knives 34 is such that when the knife holding frame is in the operating position shown in Fig. 2, said transverse knives will be disposed tangentially of the approach side of a small circle 68 shown in broken lines. The approach side of the circle 68 is that side from which the slicing knives approach material to be cut thereby. Tangential lines 69, also shown broken, indicate planes coinciding with those of the knives 34.

Fruit, vegetables or other material to be operated upon by the machine may be placed within a hopper 70 which is pivotally disposed upon a support bracket 71, the latter being mounted upon the left end of the base 10, Fig. 1. The pivotal movement of the hopper 70 is about the axis within a pivot pin 72; see Fig. 3. Said hopper 70 extends downwardly into the drum structure 17, where, by means of an opening 73, material is fed therefrom into a guiding tube 74 which is secured to a side of the bracket 71. A pair of arms 75, shown in dotted outline in Fig. 3, may be used for attaching the tube 74 to the bracket 71. Also secured to the bracket 71, is a lug 76 to which is anchored one end of a contraction spring 77. The opposite end of the spring 77 is connected to a lug 78 which is attached to the bottom of the hopper 70. A second lug designated 79 is fastened to the bottom of the hopper 70. Lug 79 is adapted to abut against one side of the feeder tube 74 so as to limit in one direction the pivotal movement of the hopper 70 under the influence of the spring 77. Attention is now directed to a vertical angle piece 80 upon the left upper edge of the hopper 70. The angle piece 80 constitutes an abutment which is adapted to be successively engaged by each of a series of rollers 81 journalled upon studs 82 anchored equidistantly about the drum structure plate 18.

The operation of that form of the device above set out will now be described:

When material to be operated upon by the machine has been placed in the inclined hopper 70 and when the drum structure 17 is rotated by means of a prime-mover disposed in driving connection with the pulley 16, the rollers 81, Fig. 3, will be carried successively against the abutment member 80 to effect counter-clockwise pivotal movement of the hopper 70 about the pivot pin 72 in opposition to the force of the spring 77. As soon as a roller 81 passes off of the upper end of the abutment member 80 the hopper will be released and quickly returned by the spring 77 to the position shown in Fig. 3. Thus a vibratory movement is imparted to the hopper so that the movement of the material therein toward the hopper opening 73 will be expedited. It will be observed in Fig. 3 that the opening 73 in the bottom of the hopper 70 is of greater area than the cross-sectional area of the feeder tube 74. Consequently, the upper end of the tube 74 will remain uncovered irrespective of the position of the hopper.

The manner in which the device is adapted to operate upon comparatively large articles designated 83, which have been shaken by the hopper 70 downwardly and through the aperture 73 thereof into the guiding tube 74, is shown in Figs. 7, 8 and 9. Gravity acting upon the articles 83 forces them into engagement with the inner periphery of the side wall of the drum structure 17 and into the path of the rotating knives 31. Referring now to Fig. 7, it will be conceived that the lower article 83 prior to being engaged by the knife 31 was resting upon the trailing inner peripheral edge sections 29 of the ribs 25 just ahead of such knife. Movement of the article 83 with the ribs and knives of the drum structure is precluded by the right wall of the guiding tube 74 so that subsequently the knife is carried against and through said article to remove therefrom a slice 84 which is shown but partially removed in Fig. 7.

In Fig. 8 the slice 84 will be seen to have been completely severed from its article 83. The cam-like ribs 25 upon the main body section 21 associated with the knife 31 which has removed the slice 84 are in registry with respective spaces between the longitudinal knives 33, so as rotation of the drum structure 17 ensues until the position shown in Fig. 8 is reached, such ribs 25 will force the slice 84 downwardly past the knives 33, and will thereby cause the slice 84 to be severed into strips. During continued rotation of the drum structure 17 the ribs 25 will be carried into the position shown in Fig. 9 where they will be seen to have forced the strips downwardly between the second bank of knives 34. When the strips of the slice 84 are forced downwardly between the knives 34 such strips are cut transversely into cubes. In Fig. 9 it will be noted that the ribs 25 at their maximum radial width near the tip 27 have a slight clearance with respect to the cutting edges of the knives 34. Such clearance of the ribs 25 enables them to force the strips of the material a goodly distance onto the knives 34 while at the same time avoiding injury by the cam ribs to the cutting edges of the knives. Should it happen the material being operated upon by the machine possesses considerable toughness there may be a tendency for the sections cut by the knives 34 to be held together by ligatures of the material between the cutting edges of the knives and the ribs 25, but this fact will be of no significant consequence because those sections will be forced completely past the cutting edges of the knives 34 by the material taken from succeeding slices.

Any tendency for the slice 84 to be moved longitudinally of the knives 33 while acted upon by the ribs 25 is prevented by abutment blocks 85 which may be secured to the ribs so as to project outwardly into the spaces between the knives. There will be no such tendency of the material to creep with the ribs 25 while such material is being forced between the knives 34 since the knives 34 extend transversely of the path traversed by the ribs.

Each of the knives 31 and its associated group of ribs 25 operate upon the material and cooperate with the knife banks as explained above with respect to but one knife and rib unit. As the slices are removed from the material by the knives 31 the body of unsliced material is lowered into the path of the succeeding knife and so on until the guiding tube 74 is emptied.

It is essential to the commercial practicability of a machine of the present kind that it minimize mashing or bruising of the material. This required mode of operation is accomplished by the present machine in part because of the arrangement of the knife banks in such a manner that they will be engaged one after the other by the material. A further refinement upon the present machine is incorporated into the arrangement of the knives 34. It will be observed that the lower edges of the knives 34 are spaced apart greater distances than the corresponding sharpened upper edges. As a consequence of this arrangement the material, when forced past the knives 34 will be cut into pieces having a dimension of less extent than the distance between the main body portion of the knives, so there will be substantially no frictional resistance offered thereby to the passage of the material subsequent to its severance. The present machine further tends to diminish the frictional resistance to the passage of material between the knives 34 because of the entire bank thereof being turned substantially as a unit a slight distance so as to cause them to direct their cutting edges somewhat oppositely to the direction of travel followed by the ribs 25. This construction is illustrated by the broken lines 68 and 69 of Fig. 2. The spaces between the knives of the knife bank are thus so situated as to more readily receive the material passed thereinto.

The latch mechanism shown in Fig. 2 is adapted to hold the banks of knives 33 and 34 in operating relation with the drum structure 17 at all times excepting when a hard foreign object may accidentally find its way into the dicing section of the machine. An object too hard to be cut by the knives 33 or 34 when pressed thereagainst by the cam ribs 25 will force the latch pin 56 downwardly while pivoting the levers 60 and 61 against the urge of spring 67. When depressed far enough the pin 56 will slip over the point 62 of lever 60 and allow the knife banks to drop out of operating range of the cam ribs and thus avoid injury by the foreign object.

A second embodiment of the invention is shown in Figs. 10 and 11 where the apparatus is illustrated upon a base 90 having a bearing standard 91 containing a bearing 92 wherein there is journalled a drive shaft 93. Said drive shaft 93 may be propelled by means of a pulley 94. Upon the left end of the drive shaft 93 is keyed a circular plate or disk 95. A second disk indicated at 96 is disposed in opposed relation with the disk 95, the disk 96 having a central opening 97. Disks 95 and 96 are coupled together by walls 98 of a diametric chamber 99 contained within the device. Yieldable pusher plates 100 may be secured to one end of each of the walls 98. A cylindrical knife carrier member 101 may be secured to the plate 96 by means of bolts 102.

In Fig. 11 the cylindrical member 101 will be seen to have diametrically opposite openings 103 and 104 disposed oppositely of the end openings in the chamber 99. Each of the openings 103 and 104 is equipped with a bank of spaced apart knives 105. Said knives 105 are curved as shown in Fig. 11 and the number of such knives may be ascertained by an examination of Fig. 10. The knives 105 may be secured to the cylindrical member 101 by means of pins 106 extending through their ends and into suitably apertured ears 107 disposed upon the interior of the member 101. Extending transversely of the knives 105 are knives 108. Knives 105 and 108 correspond respectively to knives 33 and 34 described hereinabove and may be notched similarly to the knives 33 and 34 to make the fabricated structure more rigid.

The bearing bracket 91 embodies a disk-like section 109 from which there extends to the left, Fig. 10, a substantially cylindrical non-rotatable flange 110. The non-rotatable flange 110 will be seen, Fig. 11, to contain a slit-like opening 111 having edges 112 and 113 displaced different distances radially with respect to the axis of the drive shaft 93. A knife 114 is anchored in the opening edge 112.

Material to be treated may be fed into the chamber 99 of this second embodiment of the invention by means of a hopper 115. Motive power for the device is applied to the pulley 94 and thence to the shaft 93. The power is applied in the proper direction to cause the plates 95 and 96, the chamber 99 disposed therebetween and the cylindrical knife carrier 101 to rotate clockwise as indicated by the arrow in Fig. 11. Meanwhile the cylindrical flange 110 having a row of cam-ribs 116 (of which one can be seen in Fig. 11) is held against rotation. When, for example, the articles 117 to be operated upon by the device are fed into the chamber 99 and are propelled by the side-walls 98 of the chamber, such articles will be thrown centrifugally outwardly into frictional engagement with the interior of the flange 110. The opposite open ends of the chamber 99 together with the knife banks adjacent thereto alternately pass the knife 114 whereby slices are removed from the articles in much the same manner as has been described above in connection with the first embodiment of the invention. The slices are successively forced by the ribs 116 past the banks of longitudinal and transversely arranged knives so that the slices are first cut into strips and then the strips into cubes.

While the terms "dicing" and "cubes" have been used hereinabove for describing the particles which the illustrated embodiments of the invention are adapted to prepare, it will be understood other shapes may be readily effected by modifying the angularity or contour of the knives in the knife banks, and hence the term "dicing" when employed hereinafter in the claims is not to be construed as a limitation to particles of cubical configuration.

I claim:

1. Slicing apparatus comprising a curved slicer member having leading and trailing edges respectively at the extremities of curvature thereof, cutting means upon said leading edge, and a plurality of spaced apart cam elements upon said member, said cam elements extending away from said leading edge toward the trailing edge and having extension sections projecting beyond said trailing edge, and the inner faces of such extension sections receding radially outwardly with respect to the curvature in said curved member.

2. The combination within a machine of the class described, of a bank of parallel knives, a bank of knives disposed behind and in registry with the first bank, a movable member having a plurality of cam elements thereon, said member being movable longitudinally of the knives of the first bank, and said cam elements being so disposed as to pass between the knives of the first bank and in close proximity with the knives of the second bank as an incident to the movement of said member.

3. A dicing machine comprising a bank of parallel knives, a bank of knives disposed behind and in registry with the first bank, the knives of the second bank extending transversely of the knives of the first bank, a movable member having thereon a plurality of cam ribs, said member being movable longitudinally of the knives in the first bank, the cam ribs being so disposed on said member as to pass between the knives of the first bank as an incident to such movement, and the slope of said cam ribs from their leading ends being toward said knives and of such an extent that the most prominent portion of the ribs passes in close proximity with the knives of the second bank.

4. A dicing machine comprising a rotatable carrier curved about its rotational axis, said carrier having inner and outer peripheries and leading and trailing edges, cutting means in the leading edge of said carrier, cam ribs on the outer periphery of said carrier, said cam ribs sloping radially outwardly and toward the trailing edge from an area adjacent to the leading edge, and a pair of knife banks in opposed relation with the outer periphery of said carrier, the knives in one of said banks being in parallelism with and permitting said ribs to pass therebetween during rotation of said carrier, the other of said banks being in registry with the first bank radially of said carrier but further removed from the carrier, and the knives in the second bank being directed transversely of those in the first bank.

5. A dicing machine comprising a rotatable member having a cylindrical side-wall containing an opening, a knife within an edge of such opening, cam ribs extending about the exterior of said side-wall from an area adjacent to said knife, means within said member for holding material to be operated upon thereby against the cylindrical wall, said member being rotatable in a direction enabling the knife to remove a slice from such material and to direct the slice outwardly through such member opening, and a knife bank outwardly of said rotatable member, said knife bank including knives extending longitudinally of said ribs and spaced apart sufficiently to permit the ribs to pass therebetween during rotation of said member.

6. A dicing machine comprising a rotatable drum structure having a substantially cylindrical side-wall containing a plurality of slit-like openings extending axially of said structure, knives at the trailing edges of said openings, the cutting edges of said knives being disposed more inwardly of said drum structure than that portion of the side-wall defining the leading edges of such openings, and groups of cam-like ribs, such groups corresponding in number with the number of side-wall openings, the ribs of each group originating adjacently to the trailing edge of one of said openings and extending around the side-wall toward the next succeeding opening, and said ribs increasing in reach radially of the drum structure as they extend from their area of origin.

7. A dicing machine comprising a drum structure having a substantially cylindrical side-wall rotatable about its principal axis, there being in said side-wall an opening, a slicer knife in a side of such opening, cam-like ribs extending about the exterior of said side-wall from an area adjacent to said knife, feeding means for presenting to the interior of said side-wall material which said slicer knife is adapted to cut into slices and direct outwardly of such opening during rotation of the drum structure, a bank of knives in opposed relation with the outer periphery of said side-wall, said knife bank being adapted to receive the material discharged through said side-wall opening and being disposed in such proximity with said drum structure that during rotation of said wall the ribs thereon will press the discharged material between the knives of said bank, said knives extending crosswise of said ribs and converging upon a limited area within the drum structure.

8. A dicing machine comprising a drum structure having a substantially cylindrical side-wall rotatable about its principal axis, there being in said side-wall an opening, a slicer knife in a side of such opening, cam-like ribs extending about the exterior of said side-wall from an area adjacent to said knife, feeding means for presenting to the interior of said side-wall material which said slicer knife is adapted to cut into slices and direct outwardly of such opening during rotation of the drum structure, a bank of knives in opposed relation with the outer periphery of said side-wall, said knife bank being adapted to receive the material discharged through said side-wall opening and being disposed in such proximity with said drum structure that during rotation of said wall the ribs thereon will press the discharged material between the knives of said bank, said knives extending crosswise of said ribs and being arranged within planes lying tangentially to the approach side of a small circle coaxial with the principal axis of the drum side-wall.

9. A dicing machine comprising a drum structure having a substantially cylindrical side-wall rotatable about its principal axis, there being in said side-wall an opening, a slicer knife in a side of such opening, cam-like ribs extending about the exterior of said side-wall from an area adjacent to said knife, feeding means for presenting to the interior of said side-wall material which said slicer knife is adapted to cut into slices and direct outwardly of such opening during rotation of the drum structure, a bank of knives in opposed relation with the outer periphery of said side-wall, said knife bank being adapted to receive the slices discharged through said side-wall opening, the knives of said bank being parallel with the ribs on said side-wall and disposed in such relation therewith that during rotation thereof the ribs will pass between the knives incident to cutting the slices into strips by pressing the slices past the knives, another bank of knives arranged crosswise of the knives in the first bank, said other knife bank being placed to receive such strips and to permit such strips being pressed therebetween by said ribs as an incident to cutting said strips into shorter lengths.

10. A dicing machine comprising a drum structure having a substantially cylindrical side-wall rotatable about its principal axis, there being in said side-wall an opening, a slicer knife in a side of such opening, cam-like ribs extending about the exterior of said side-wall from an area adjacent to said knife, feeding means for presenting to the interior of said side-wall material which said slicer knife is adapted to cut into slices and direct outwardly of such opening during rotation of the drum structure, a bank of knives in opposed relation with the outer periphery of said side-wall, said knife bank being adapted to receive the slices discharged through said side-wall opening, the knives of said bank being parallel with the ribs on said side-wall and disposed in such relation therewith that during rotation thereof the ribs will pass between the knives incident to cutting the slices into strips by pressing the slices past the knives, another bank of knives arranged crosswise of the knives in the first bank, said other knife bank being placed to receive such strips and to permit such strips being pressed therebetween by said ribs as an incident to cutting said strips into shorter lengths, the knives in said other knife bank being arranged within planes lying tangentially to the approach side of a small circle coaxial with the principal axis of the drum side-wall.

11. In a dicing machine, a substantially cylindrical side-wall having an opening, a knife within an edge of such opening, the opposite edge of such opening being displaced radially outwardly more distantly than the knife carrying edge, cam-ribs extending about an exterior section of said side-wall, said ribs extending away from the knife edge of the opening and increasing in radial reach with such extent, a chamber within and rotatable coaxially of said side-wall, said chamber having a radial opening adjacent to the inner periphery of said side-wall, a knife carrier exteriorly of said side-wall and rotatable with said chamber, a group of knives on said carrier in axial registry with the opening in said chamber, said knives extending longitudinally of said ribs and being spaced apart to pass within the spaces between the ribs during rotation of said chamber and said carrier.

12. Apparatus as set out in claim 11, but wherein there is an additional group of knives disposed radially outwardly of and transversely of the knives in the other group, and such additional group of knives being selectively spaced radially of the side-wall so as to provide a slight clearance between their cutting edges and said ribs during rotation of said chamber and the knife carrier.

WILLIAM E. URSCHEL.